United States Patent [19]

Mills

[11] Patent Number: 5,323,566
[45] Date of Patent: Jun. 28, 1994

[54] PLANT PROTECTOR APPARATUS AND METHOD

[76] Inventor: Thomas B. Mills, 445 Lourdes La., Lafayette, Ind. 47905

[21] Appl. No.: 855,220

[22] Filed: Mar. 20, 1992

[51] Int. Cl.$^5$ ............................................. A01G 13/00
[52] U.S. Cl. ............................................. 47/58; 47/30
[58] Field of Search ................. 47/30, 30 T, 24, 58.01

[56] References Cited

U.S. PATENT DOCUMENTS

| | | |
|---|---|---|
| 645,518 | 3/1900 | Watt .................. 47/30 OT |
| 1,299,870 | 4/1919 | Stevenson ............ 47/30 OT |
| 1,875,533 | 9/1932 | Weaver . |
| 3,816,959 | 6/1974 | Nalle, Jr. . |
| 4,700,507 | 10/1987 | Allen . |
| 4,899,486 | 2/1990 | Hurlstone . |
| 5,090,155 | 2/1992 | Rodgers ............. 47/30 OT |

FOREIGN PATENT DOCUMENTS

| | | |
|---|---|---|
| 3621614 | 1/1988 | Fed. Rep. of Germany ... 47/30 OT |
| 15984 | 6/1895 | United Kingdom ............ 47/30 OT |
| 7424 | 3/1906 | United Kingdom ............ 47/30 OT |
| 2213033 | 8/1989 | United Kingdom ............ 47/30 OT |

OTHER PUBLICATIONS

The Progressive Farmer vol. 80 No. 2 p. 52 copy in 47/24.

*Primary Examiner*—Henry E. Raduazo
*Attorney, Agent, or Firm*—Woodard, Emhardt, Naughton Moriarty & McNett

[57] ABSTRACT

A reusable plant protector apparatus which can be anchored to the earth comprises a polymeric sheet having a top edge, a bottom edge, and two side edges. The two side edges further comprise a plurality of matching pairs of apertures which are offset from the side edges. The matching apertures are aligned such that an aperture on one side edge bas a corresponding aperture on the other side edge when the sheet is formed into a cylinder with a side edge overlap. The plant protector apparatus also includes a stake and a plurality of flexible ties extending through the apertures and around the stake for securing the overlapping side edges and the stake to each other. The ties are tightenable to tighten the stake against the overlapping edges thereby sealing the edges and forming a flexible cylinder around the plant to be protected. The plant protector creates a sheltered climate of higher temperature and humidity around the plant. The plant protector apparatus may also be vented to adjust the temperature and humidity surrounding the plant.

6 Claims, 8 Drawing Sheets

PLANT PROTECTOR APPARATUS AND METHOD

BACKGROUND OF THE INVENTION

This invention relates generally to the field of plant protectors which are placed around a plant to provide protection and a favorable growing environment for plants, such as trees.

Plant protectors are used to protect young trees and other types of plants from animals, particularly rabbits, rodents and deer. They are also useful for increasing the humidity near the plant thereby creating a favorable sheltered climate inside the plant protector. The sheltered climate inside the plant protector has a higher humidity due to retention of water vapor by the plant protector.

A plant protector may also raise the temperature of the sheltered climate around the plant, which is especially beneficial during colder spring months. Use of a plant protector may protect the plant from early spring cold spells, lengthen the growing season and increase the rate of growth. The increased growth may be beneficial to reforesting or orchard operations. Plant nurseries may also benefit from the increased plant growth which often occurs with the use of plant shelters. However, elevated temperatures in the sheltered climate may cause problems in the fall months by delaying when the plant goes dormant. Thus, the plant protector optimally is removed or is vented to lower the temperature surrounding the plant.

U.S. Pat. No. 4,899,486 to Hurlstone relates to a tree shelter having an elongated tubular body including a longitudinal channel or groove for receiving a stake and which is open at opposing ends. The device is formed of unperforated plastic material which allows light to pass therethrough. Hurlstone contemplates a continuous walled tubular body so that it lacks any capacity for enlarging the diameter of the tubular body. The Hurlstone device is further limited in application because of the inherent difficulty of placing a closed cylinder over plants having spreading branches.

Other types of plant protectors include U.S. Pat. No. 3,816,959 to Nalle which discloses a plant protector having tubular mesh to prevent plants from being damaged by animals. However, this particular device provides little favorable sheltered climate effect due its use of open tubular mesh which permits circulation of air there through.

U.S. Pat. No. 4,700,507 to Allen discloses a tree bark protector made from high impact polyurethane plastic molded into half sections which can be fitted over the base portion of a tree trunk where it widens into the soil. The Allen device includes ground engaging anchors for a bottom flange. The facing edges of the half sections accommodate molded locking connectors in enlarged or swollen portions.

U.S. Pat. No. 1,875,533 to Weaver discloses a tree protector formed from concrete which rests on the surface of the ground and surrounds the base of a tree, The disclosed apparatus includes three longitudinal solid sections of identical size and shape secured in assembled relation by wires.

SUMMARY OF THE INVENTION

One embodiment of the present invention is characterized by a resilient polymeric sheet having a top edge, a bottom edge, and two side edges. The two side edges further comprise a plurality of matching pairs of apertures which are offset from the side edges. The matching apertures are aligned such that in aperture on one side edge has a corresponding aperture on the other side edge when the sheet is formed into a cylinder. The offset of the apertures from the side edges permits a small overlap of the edges. The plant protector apparatus also includes a stake and a plurality of flexible ties which extend through the apertures and around the stake for securing the overlapping side edges and the stake to each other. The ties are tightenable to press the stake against the overlapping edges thereby sealing the edges and forming a flexible cylinder around the plant to be protected.

In another aspect of the invention, the plant protector apparatus comprises a polymeric sheet having a substantially smooth inner ply affixed to an outer corrugated ply having grooves that extend longitudinally along the sheet. A further feature of the present invention includes bendable flaps along the top edge of the smooth inner ply. The flaps are defined by a plurality of longitudinal slits located on a portion of the smooth ply that extends beyond the top edge of the corrugated layer.

The invention also contemplates a method in which a plurality of plant protector sheets are interengaged to provide either a taller cylinder or a larger diameter cylinder to protect larger plants.

One object of the present invention is to provide a reusable plant protector apparatus which may be easily and quickly placed around a plant to be protected. Another object of the present invention is to simplify installation of the plant protector by attaching the side edges and the stake together in one operation.

A further object of the present invention is to provide means for ventilating the plant protector, yet another object of the invention is to provide a plant protector apparatus which is compact and economical to produce. A further object is to provide a plant protector which may be easily installed around a tree having spreading branches above the trunk area.

Other objects, and certain benefits, of the present invention will become apparent to those of ordinary skill in the art from the following written description and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1-4, a plant protector apparatus 11 is illustrated which comprises a resilient polymeric sheet 13 having a top edge 15, a bottom edge 17, and two side edges 19 and 21. The apparatus also includes a number of apertures 22 and 23 defined in matching pairs at the opposite side edges 19 and 21, respectively. These matched apertures 22 and 23 can be aligned such that an aperture on one side edge 19 has a corresponding aperture on the other side edge 21 when the sheet 13 is formed into a cylinder 24. The apertures 19 and 21 are offset from their respective side edges so that the edges may overlap, as shown by side edge overlap 27 in FIG. 3.

Figure 1:
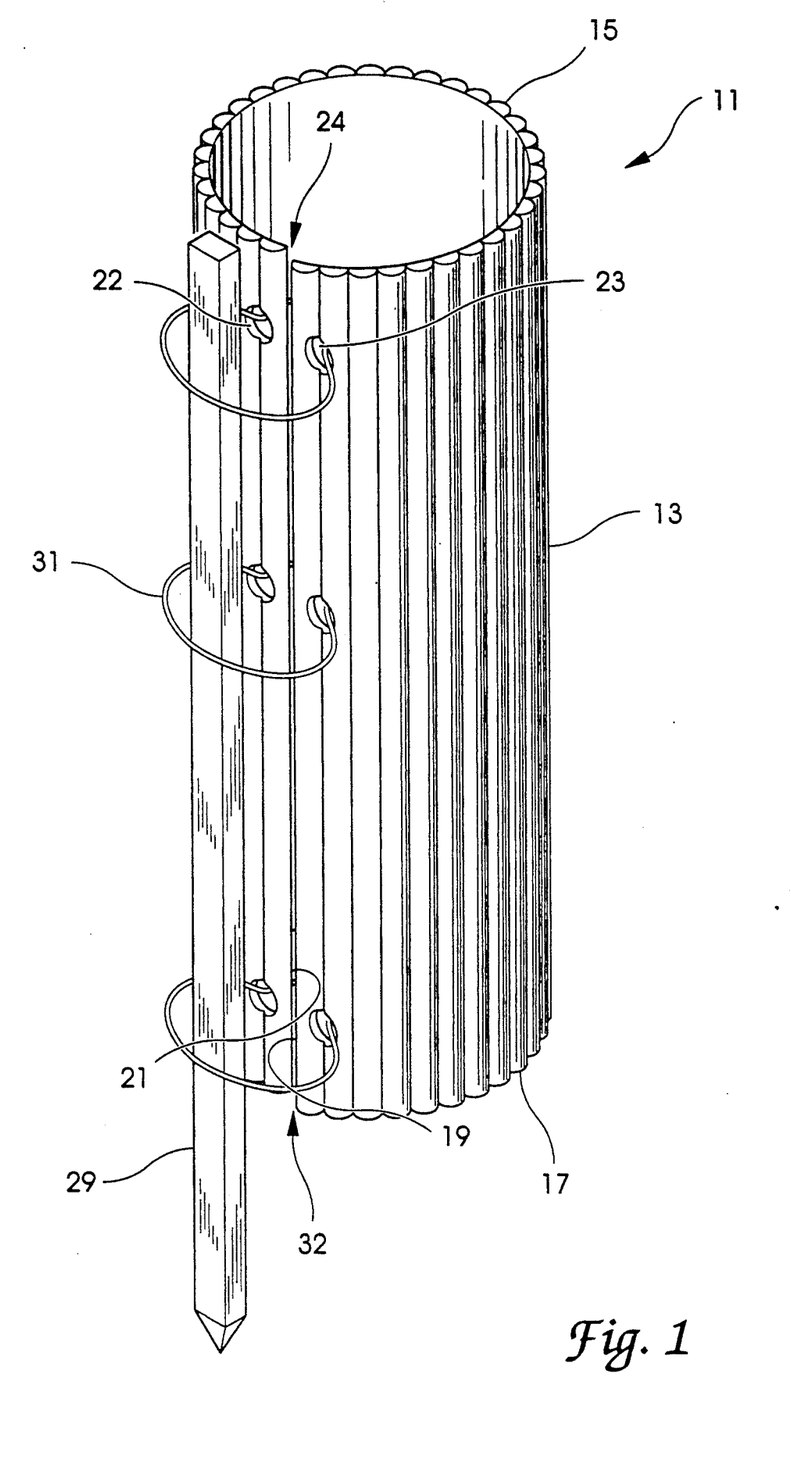
FIG. 1 is a side elevational view of the plant protector apparatus having flexible ties engaged but not tightened about a support stake, thus illustrating the relationship of the side edges, the apertures, the ties and the stake prior to tightening the flexible ties.
Figure 2:
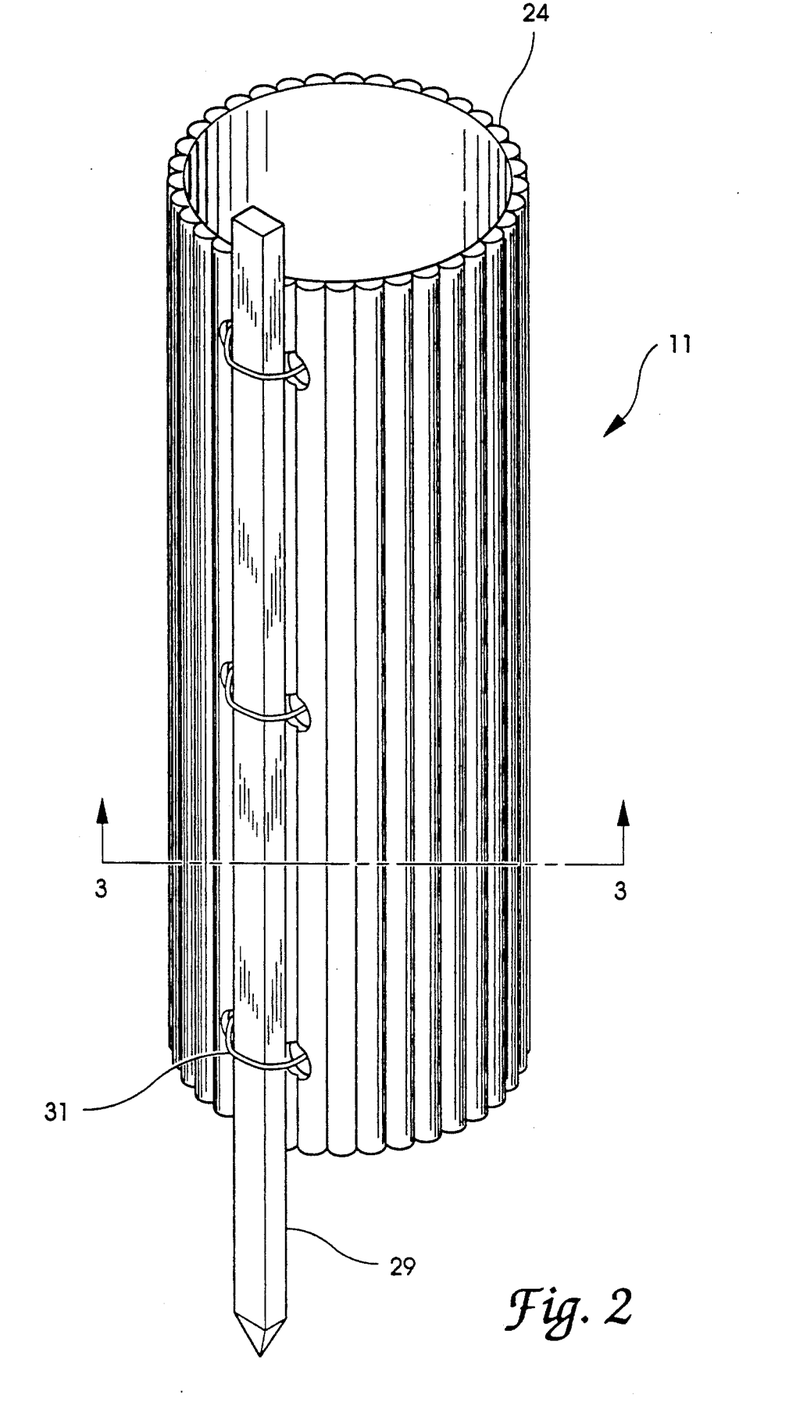
FIG. 2 is a side elevational view of the apparatus in FIG. 1 with the ties tightened about the stake.
Figure 3:
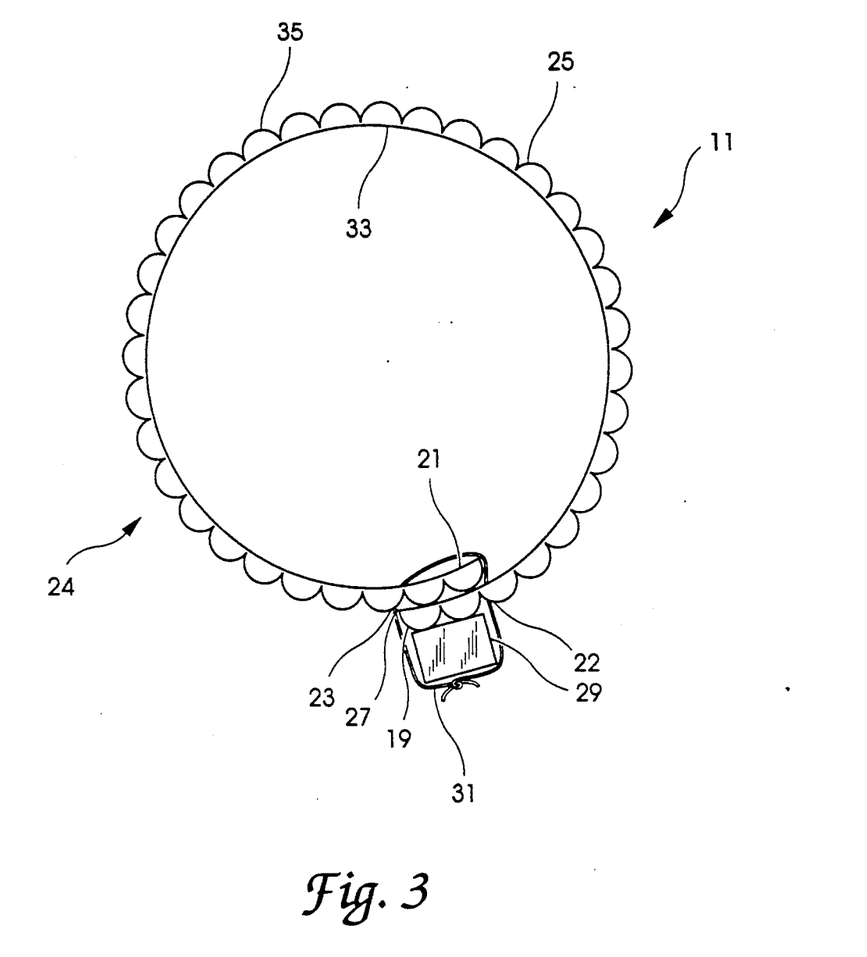
FIG. 3 is a cross-sectional view of the apparatus in FIG. 2 showing the overlapping side edges tightened against the stake and showing the inner substantially smooth layer and the outer corrugated layer.

The apparatus also includes a stake 29 for anchoring the apparatus to the ground. A number of flexible ties 31 extend through the matching apertures 22 and 23 and around the stake 29 to secure the side edges 19, 21 and stake 29 to one another. The ties 31 are tightenable to force the side edges into overlapping relation and to press the stake 29 against the overlap 27, thereby sealing the edges and forming a cylinder 24 around the plant to be protected. A preferred side edge overlap is about one inch, which requires a stake 29 having a comparable width.

FIG. 1 illustrates the flexible ties 31 passing through the matching apertures 22 and 23 and around the stake 29 but not yet tightened. FIGS. 2 and 3 illustrate the normal operating position of the apparatus in which the flexible ties 31 are tightened to secure the edges and stake together thereby forming a seal along the overlap 27.

Figure 4:
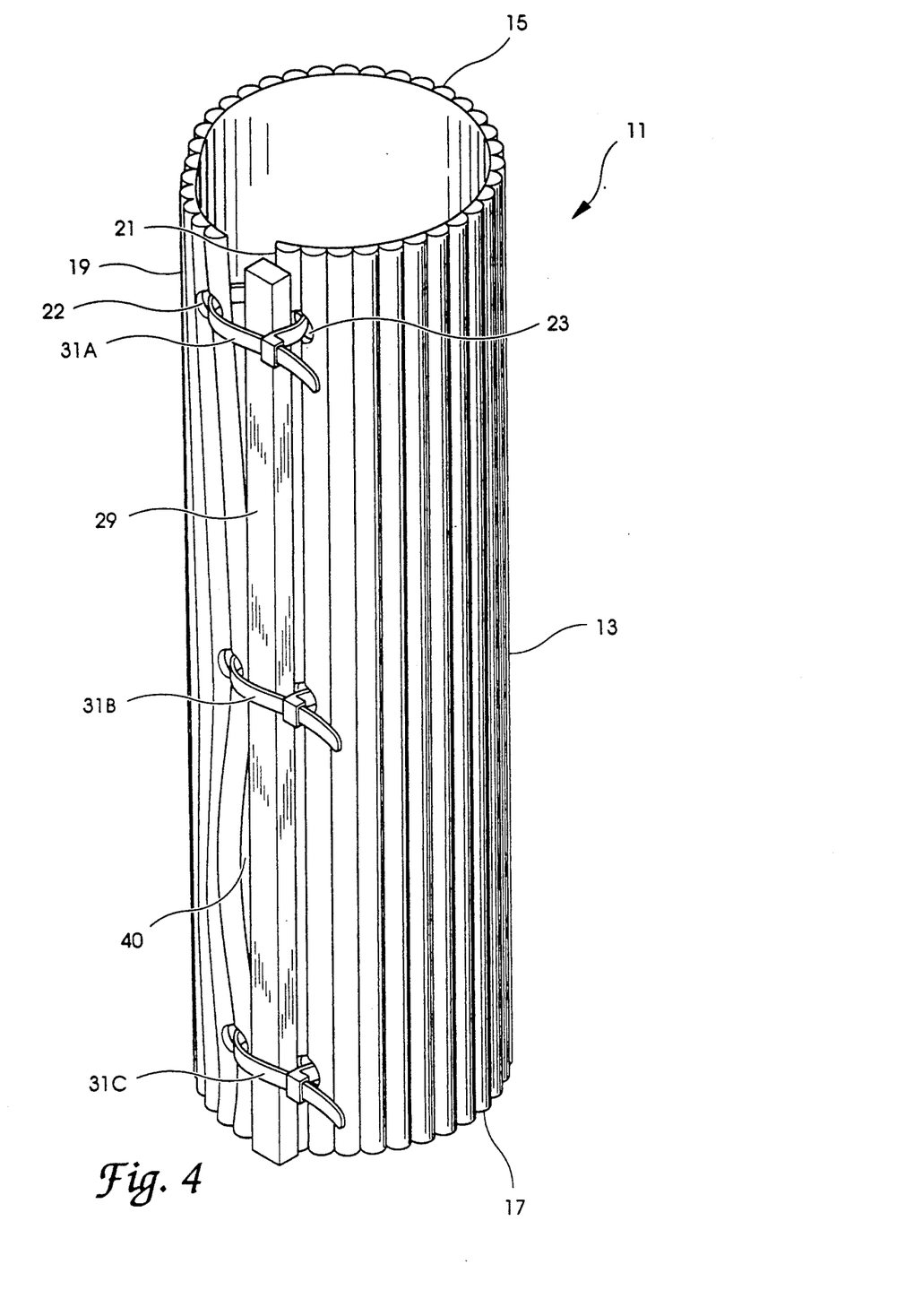
FIG. 4 illustrates a side elevational view of the apparatus in FIG. 1 having a "window" formed.

FIG. 4 illustrates apparatus 11 having a "window" 40 which includes all of the features described in FIGS. 1-3. The plant protector apparatus 11 is shown with three ties, 31A, 31B and 31C which can define a "window" 40 while maintaining a rigid connection to the stake. This is accomplished by loosening the top tie 31A and middle tie 31B, pulling the side edge 19 over the stake 29. The bottom tie 31C is left tight leaving a portion of the side edge 19 near the bottom edge 17 located adjacent to the side edge 21 while the remaining portion of the outer overlapping edge is positioned adjacent to the stake 29 so that the stake is between both side edges 19 and 21 above the lower tie 31C and tightening the top tie. An alterative method for venting the plant protector apparatus 11 includes loosening the middle tie 31B, separating side edge 19 from side edge 21 and inserting a wedge or stake between the side edges thereby maintaining a ventilation opening.

Preferred materials for the resilient sheet 13 include polyethylene and polypropylene, although alterative polymers may be used. It is also contemplated that bubble pack sheet material, single layer sheets, polymeric foams and sheets of treated cellulose or other similar materials can be used as long as they are flexible and are substantially resistant to decay from the elements. It is contemplated that the polymeric sheets permit passage of light therethrough, although alterative embodiments may include opaque polymeric sheets and the use of color to absorb or reflect light to modify the heat generated. An alterative embodiment of the plant protector is contemplated that uses a biodegradable material that does not require removal after use.

An especially preferred material for the sheet 13 is a multiple ply resilient polymeric material having a substantially smooth inner ply or layer 33 and corrugated outer ply 35, as shown in FIG. 3. It is contemplated that the sheet material be of sufficient gauge to weigh about go to 150 pounds per thousand square feet. The preferred weight of material being 130 pounds per thousand square feet. A variety of corrugation patterns and sheet gauges may be used to vary structural characteristics and resiliency of the sheet 13 for the desired application. The two layers are preferably bonded together. The corrugated ply includes grooves that extend longitudinally along the sheet. An advantage of corrugated outer layer and smooth inner layer for the sheet is an increase in strength provided by the corrugated layer. The substantially smooth inner layer also helps protect the plant from damage by chaffing.

The flexible ties 31 may be locking nylon ties, metal wire, rope or cloth ties. Adhesive tape may also be used to seal and adhere the side edges to one another. It is also contemplated that the side edges may be heat sealed together during manufacture or after placement around the plant. The stake 29 may be formed of wood, metal, plastic or other suitable materials for anchoring an apparatus to the ground. Although a single stake is generally used, larger cylinders or protectors placed in areas of higher winds may use multiple stakes for added security. It is preferred that multiple stakes be secured by ties passing through matching apertures.

Advantages of the plant protector include being able to open the side edges to allow ventilation to permit the plant to become dormant in the fall and to prevent overheating in warm climates, The plant protector apparatus allows the venting of the air around the plant by loosening the flexible ties and separating the side edges. This allows air to mix and pass through the tree protector to lower the temperature and humidity in a manner similar to how a greenhouse is ventilated.

The use of a flexible sheet offers significant advantages over a sealed or continuous cylinder. Many plants or trees to be protected have spreading branches which make placement of a continuous cylinder around the plant more difficult. This problem is avoided by the,, present apparatus and method which contemplates wrapping the sheet 13 around the plant and connecting the opposite edges of the, sheet to form a cylinder.

Another advantage of the plant protector of this invention is the ability to supply the protector in sheet form. The sheets may be supplied in large rolls or as precut sheets placed in packing boxes to allow better use of shipping space. The use of a sheet permits economical manufacture of the plant protector in a wide variety of diameters and heights to satisfy a variety of applications.

In using the plant protector 11, the sheet is formed around a plant and overlapping the side edges 19 and 21 to define a cylinder. The user next aligns the matching apertures 22 and 23 along the side edges, and places the stake 29 at the overlap 27. Ties 31 are passed through the apertures and around the stake and tightened to seal the edges. The stake can be anchored into the ground before or after the ties have been engaged around the stake. The user may also slip the ties over the stake after the ties have been loosely engaged through the apertures.

The stability of the plant protector may also be increased by inserting a portion of the bottom edge 17 into the earth to reduce lateral twisting and turning caused by wind. The insertion of the bottom edge in to the ground for increased stability is especially effective when using a sheet having a corrugated outer layer 35. Insertion of the plant protector into the ground also forms a seal between the bottom edge and the ground which increases the sheltered climate effect by reducing ventilation of the tree protector.

Figure 5:
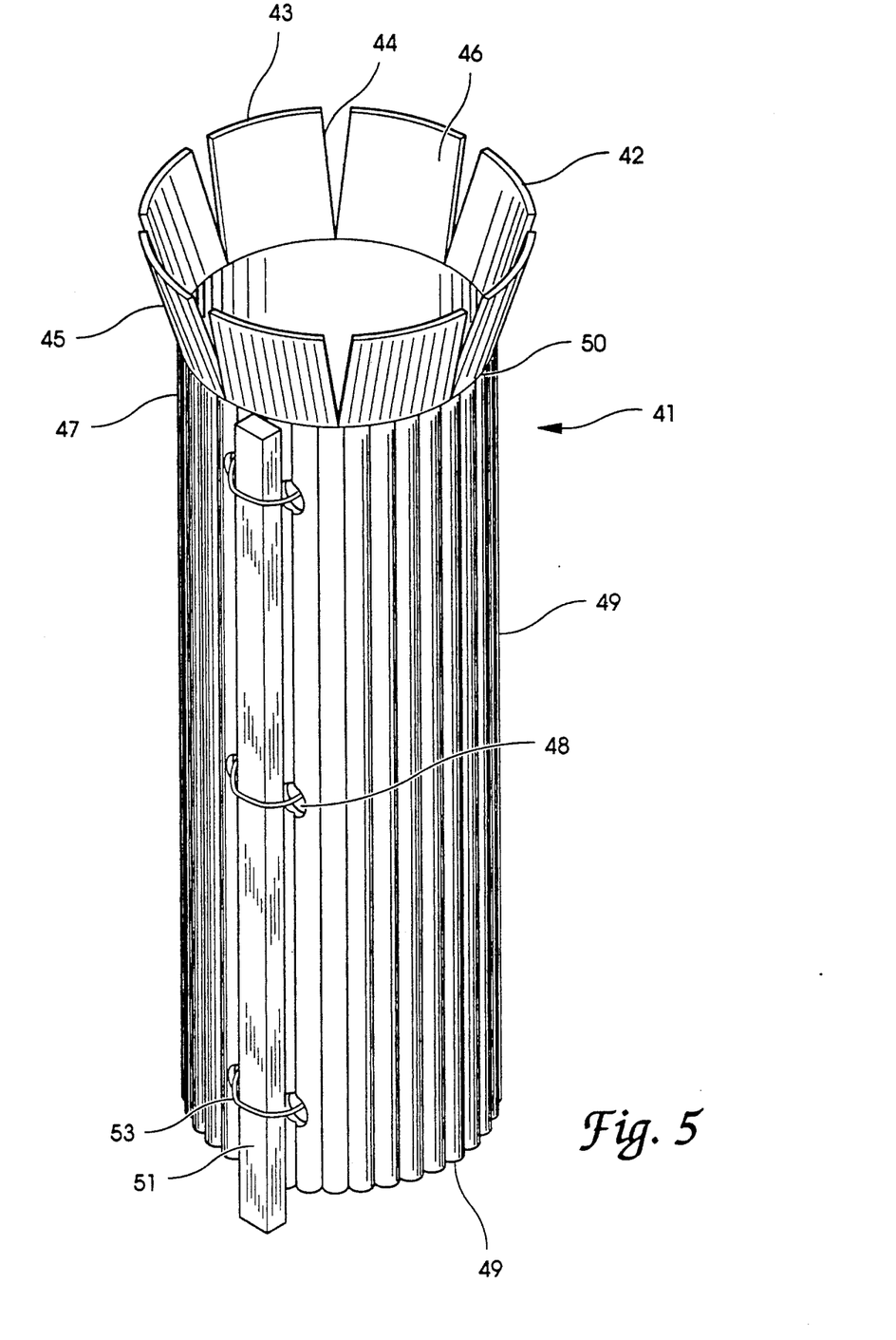
FIG. 5 illustrates an alternative embodiment of the plant protector that includes top flaps which can be bent outward of the top of the plant protector.

Referring now to FIG. 5, an alternative embodiment of the invention is shown in which a plant protector apparatus 41 includes the features of plant protector apparatus 11 and additionally includes top flaps 42 along top edge 43. The flaps 42 are defined by a plurality of longitudinal slits 44 formed on a portion 45 of the inner layer 46 which extends beyond the corrugated layer 47 to the top edge 43. The slits 44 extend from the top edge 43 to the top edge 50 of the corrugated outer layer 47. Alternatively, the flaps may be cut into the corrugated layer 47 as well. The top flaps 42 carl be folded outward to accommodate branches near the top edge 43, and to decrease chaffing damage to the branches due to motion of the protector 41 resulting from the wind. It is preferred that the flaps be at least one or two inches long although they may be shorter in alterative embodiments. The top flaps may resiliently engage the tree branches between the flaps, further securing the upper portion of the plant protector.

Alternatively, the portion 45 of the inner layer 46 which extends beyond top edge 50 of the corrugated layer 47 can be folded outwardly over the corrugated layer or extend upward. In this embodiment the portion 45 is continuous between the side edges rather than having flaps 42 defined by longitudinal slits 44 as shown in FIG. 5. The unslit portion 45 in this embodiment has been effective in reducing chaffing damage due to its substantially smooth surface and resilient cushioning effect when in contact with plants.

Figure 6:
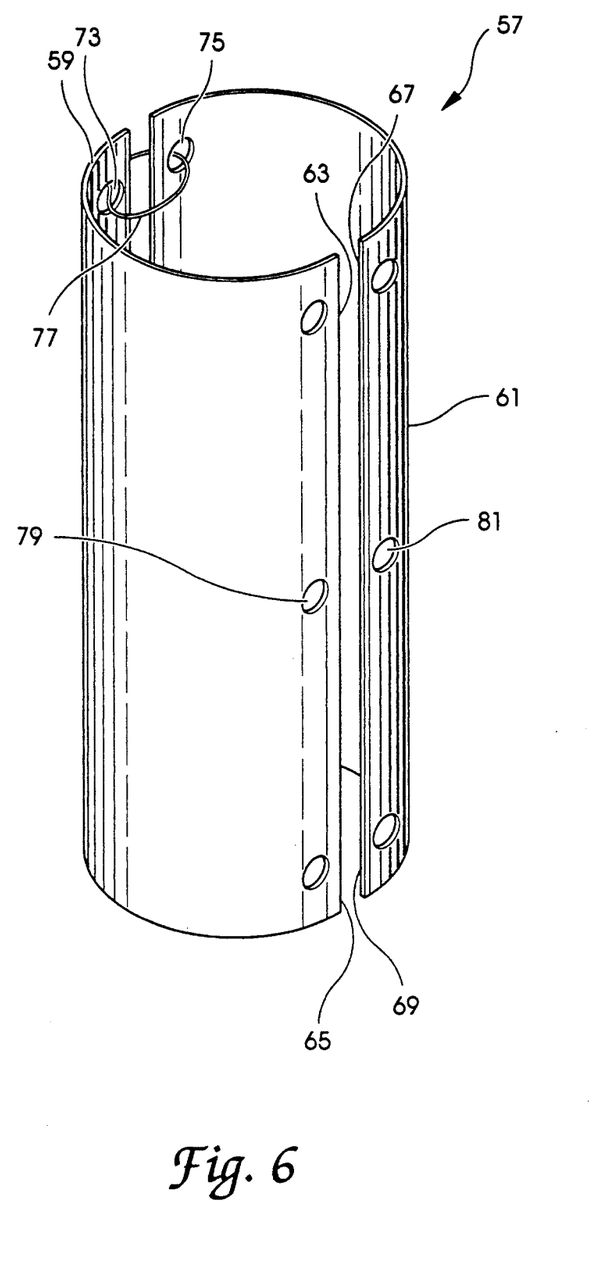
FIG. 6 is a side elevational view showing two sheets connected to provide a larger diameter plant protector with flexible ties engaged through matching side edge apertures prior to tightening. For clarity, the plant protector is shown without the stake and the flexible ties for engaging the matching apertures on the opposite side edges of the sheets.

FIG. 6 illustrates a composite plant protector 57 formed by a first sheet 59 and a second sheet 61, each of which can be the configured like sheet 13 in FIG. 1. The first sheet includes a first side edge 63, and a second side edge 65, while the second sheet also includes a first side edge 67 and a second side edge 69. The first side edges 63 and 67 each include a number of matching apertures 73 and 75 offset from the respective side edges. The apertures 73 and 75 can be aligned so that the first side edges of the two sheets 59 and 61 overlap. Flexible ties 77 passing through the apertures 73 and 75 can secure the sheets together at the first edges 63 and 67. The second side edges 65 and 69 of the first sheet 59 and second sheet 61, respectively, also include matching apertures 79 and 81. A number of flexible ties (not shown) can be passed through matching apertures 79 and 81 to encircle a stake (not shown) in a manner described above, thereby forming a larger diameter cylinder. It is apparent that a plurality of sheets, such as sheet 13 in FIG. 1, can be connected in the manner just described to form a composite plant protector, such as protector 57 in FIG. 5. The resulting cylinder is sealed at all overlapping side edges using flexible ties.

Figure 7:
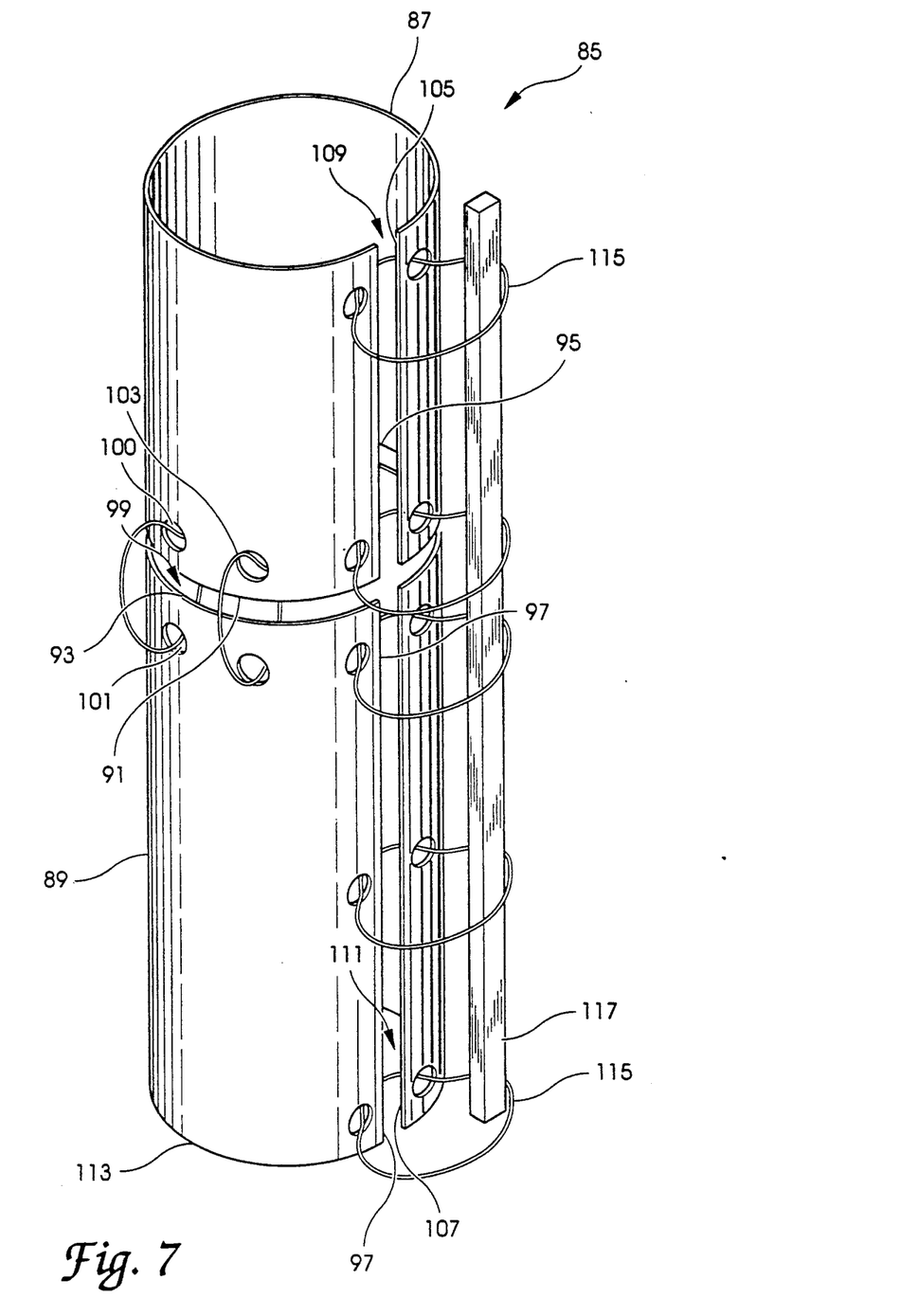
FIG. 7 is a side elevational view of a plant protector apparatus having two sheets which are vertically connected to provide a taller protector apparatus.

FIG. 7 illustrates an alternative embodiment of a composite plant protector for taller plants. In this embodiment, a composite plant protector apparatus 85 includes a first sheet 87 and a second sheet 89, each of which include the features of the sheets shown in FIGS. 1-4. The first sheet 87 includes a bottom edge 91 which is situated adjacent top edge 93 of the second sheet 89. The edges 91 and 93 include a plurality of matching apertures 100 and 101, respectively, which are located a substantially equal distance from their respective edges 91 and 93. Flexible ties 103 passing through apertures 100 and 101 connect the bottom edge 91 of the first sheet 87 to the top edge 93 of the second sheet 87 thereby forming a taller cylinder.

Plant protector 85 also includes side edges 95 on the first sheet 87 and 105 on the first sheet 87 with matching pairs of apertures 109. The second sheet 89 includes side edges 97 and 107, also with watching pairs of apertures 111. A plurality of flexible ties 115 extending through the aperture pairs 109 and 111 can be used to engage the sheets to a stake 117 in the manner described above. The stake 117 differs from the stakes previously described in that it is longer to support the taller cylinder formed by the composite plant protector 85 of FIG. 6.

It is also contemplated that the first sheet 87 and the second sheet 89 be sealed together without requiring matching apertures 100 and 101 and ties 103 passing therethrough by using adhesive tape to seal the sheets together. It is preferred to apply the adhesive tape to the inner portion of the sheets for protection from the elements prior to placement around the plant. Alternatively, the sheets may be joined by adhering the tape to the outer portion of the sheet. It is also contemplated that the sheets 87 and 89 be jollied by a heat seal. The heat seal may be formed prior to shipment to the user or by a user having heat sealing apparatus.

Figure 8:
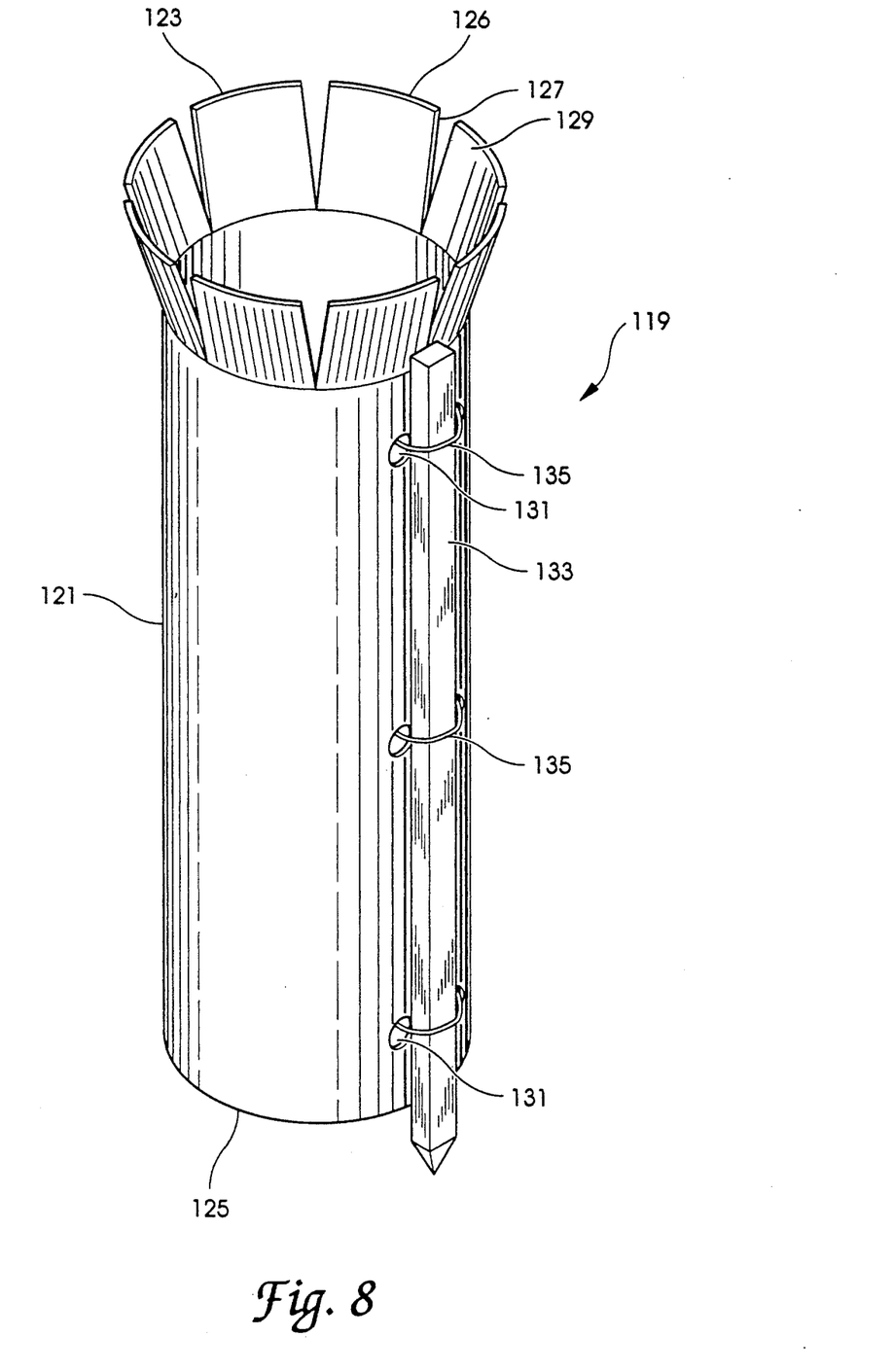
FIG. 8 is a side elevational view of an alternative embodiment of the plant protector apparatus having a tubular body.

Referring to FIG. 8, an alternative plant protector apparatus 119 is shown. The plant protector apparatus 119 comprises a resilient polymeric cylinder 121 having a top end 123 and a bottom end 125. The cylinder 121 includes a substantially contentious wall 126 which defines longitudinal slits 127 adjacent to the top end 123. Tile longitudinal slits 127 define top flaps 129 located adjacent the top end 123. The cylinder also includes matching pairs of apertures 131 spaced at uniform distances from the bottom end 125. The plant protector apparatus 119 also includes a stake 133, and flexible ties 135 which pass through the matching apertures and around the stake. The cylinder 121 in this embodiment is formed from a single face thermoplastic, cardboard or cellulosic material. It is preferred that the cylinders 121 be of slightly different diameter to permit nesting for more efficient shipment of the plant protectors. Alternatively a sheet 13 as shown in FIGS. 1-4 may have its side edges 19 and 21 beat sealed to one another to form the resilient polymeric cylinder 121. It is contemplated that the heat sealing be performed by the supplier or the user.

The plant protector is placed around the plant to be protected by sliding the cylinder over the plant, sliding the flexible ties through the matching apertures and encircling the stake. The ties are tightened and the plant protector is anchored by anchoring the stake and the bottom end into the ground. After the plant protector is anchored the top flaps are positioned by bending the top flaps outward from the plant.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of protecting plants comprising the steps of:
   (a) forming a sheet, having an outer corrugated layer and an inner smooth layer extending beyond the corrugated layer, into a cylinder having a top end and a bottom end and defining top flaps adjacent said top end and a plurality of matching apertures in said sheet;
   (b) encircling said cylinder about a plant;
   (c) anchoring an elongated stake to the ground adjacent the cylinder;
   (d) passing flexible ties through said matching apertures and encircling the stake;
   (e) tightening said ties to engage the stake to the cylinder to support the cylinder; and
   (f) bending said top flaps outward from the plant over the outer layer.

2. A plant protector apparatus comprising:
   a first sheet having a top edge, a bottom edge, and two side edges, and defining a number of matching pairs of apertures offset from said two side edges, wherein said matching apertures are aligned such that one aperture on one side edge has a corresponding aperture on the other side edge when said sheet is formed into a cylinder with said side edges in overlapping arrangement;
   a stake; and
   a number of flexible means extending through said matching pairs of apertures when said side edges are in overlapping arrangement for engaging around said stake,
   wherein said first sheet includes a corrugated layer and a smooth layer affixed to said corrugated layer and having a portion extending substantially beyond said corrugated layer adjacent said top edge of said first sheet.

3. The apparatus of claim 1 wherein each of the apertures in each of said matching pairs of apertures are spaced a substantially equal distance from said bottom edge.

4. The apparatus of claim 1 wherein said smooth layer includes top flaps defined by a plurality of longitudinal slits located on said portion of said smooth layer that extends substantially beyond said corrugated layer.

5. The apparatus of claim 1 wherein said first sheet is formed of a non-opaque material.

6. The apparatus of claim 1 wherein said one aperture on said one side edge and said corresponding aperture on said other side edge are offset about one inch from said one side edge and said other side edge, respectively.

* * * * *

UNITED STATES PATENT AND TRADEMARK OFFICE
CERTIFICATE OF CORRECTION

PATENT NO. : 5,323,566
DATED : June 28, 1994
INVENTOR(S) : Mills

It is certified that error appears in the above-indentified patent and that said Letters Patent is hereby corrected as shown below:

Column 4, line 24:  "go" should read "90"

Column 4, line 51:  comma after climates should be a period

Column 4, line 61:  comma should be removed after the

Column 4, line 64:  the comma should be removed after the

Column 5, line 36:  "carl" should read "can"

Column 6, line 28:  "watching" should read "matching"

Column 6, line 44:  "jollied" should read "joined"

Column 6, line 51:  "contentious" should read "continuous"

Column 6, line 65:  "beat" should read "heat"

Signed and Sealed this

Fourth Day of October, 1994

Attest:

BRUCE LEHMAN

Attesting Officer

Commissioner of Patents and Trademarks